United States Patent [19]

Sohmuta

[11] Patent Number: 5,787,059
[45] Date of Patent: Jul. 28, 1998

[54] OPTICAL HEAD SEEK CONTROLLER FOR OPTICAL DISK DEVICE

[75] Inventor: Mitoshi Sohmuta, Tokyo, Japan

[73] Assignee: NEC Corporation, Japan

[21] Appl. No.: 910,013

[22] Filed: Aug. 12, 1997

Related U.S. Application Data

[62] Division of Ser. No. 620,131, Mar. 21, 1996, Pat. No. 5,717,668.

[30] Foreign Application Priority Data

Mar. 31, 1995 [JP] Japan ............................. 7-63637

[51] Int. Cl.$^6$ ............................................. G11B 7/00
[52] U.S. Cl. ....................... 369/44.28; 369/44.32; 369/44.34; 369/44.37
[58] Field of Search ................... 369/44.28, 44.32, 369/44.37, 44.41, 44.25, 44.27, 44.29, 44.35, 44.36, 44.38, 44.34, 43, 47, 124

[56] References Cited

U.S. PATENT DOCUMENTS 5,148,424  9/1992  Wahci ............................ 369/44.28 X
5,168,487  12/1992  Ohsato et al. .................. 369/44.28

Primary Examiner—Muhammad N. Edun
Attorney, Agent, or Firm—Hayes, Soloway, Hennessey, Grossman & Hage, P.C.

[57] ABSTRACT

The optical head seek controller disclosed has an optical head for producing three beam spots on an optical disk and receiving three beam spots reflected therefrom, a matrix circuit for processing data contained in the three beam spots formed on the optical head to generate and output a predetermined track error signal when accessing a track, and a controller for controlling the movement of the optical head to a desired track position by calculating a relative position and a speed of the optical head according to the predetermined track error signal from the matrix circuit. The matrix circuit comprises a first track error signal generator for generating a first track error signal for track accessing on the optical disk, and a second track error signal generator for generating a second track error signal necessary for the relative position and the speed of the optical head with respect to the optical disk. The second track error signal generator has a function of generating the second track error signal by a push-pull process according to data concerning the main beam spot as the central one of the three beam spots. The arrangement enables the fast and accurate movement operation.

3 Claims, 11 Drawing Sheets

OPTICAL HEAD SEEK CONTROLLER FOR OPTICAL DISK DEVICE

This is a divisional of application Ser. No. 08/620,131 filed on Mar. 21, 1996, now U.S. Pat. No. 5,712,668.

BACKGROUND OF THE INVENTION (1) Field of the Invention

The present invention relates to an optical head seek controller for an optical disk device, and more particularly to an optical head seek controller which is necessary for high speed movement of an optical head in the disk radial direction at the time of accessing in an optical disk device.

(2) Description of the Related Art

In an optical disk device, for instance, a compact disk (CD) drive or a CD-ROM drive, information recorded in the optical disk is reproduced by using an optical head. Specifically, a converged laser spot is caused to be incident on the rotating optical disk along the tracks with a line of pits formed therein, and the optical head is used to detect intensity changes of the reflected light. The CD/CD-ROM is required to have a high speed retrieval function as a peripheral device for a computer, and it requires techniques of causing fast movement of the optical head to a desired track.

For the fast movement of the optical head to a desired address, the number of tracks up to the desired address from the present address data is calculated and the movement is made based on the calculated number. To this end, a track error signal is counted for the optical head seek operation.

The track error signal is detected by using a push-pull process, a heterodyne process or a three-beam process.

In the push-pull process, an off-set is generated in the track error signal when an objective lens is greatly deviated in the disk radial direction. Therefore, the process is used less for obtaining the track error signal for track trace control.

The push-pull process also requires control for preventing deviation of the objective lens center from the laser beam center. Desirably, a deviation from the laser beam center is detected to correct the off-set. Therefore, the push-pull process is applied only to cases using a swing arm system, which is theoretically free from deviation from the laser beam center. The swing arm system is slow in the movement, so that it is not used for CD-ROM systems which require fast accessing.

The heterodyne process uses a complicated circuit and also is subject to the influence of linear speed. Nowadays, the three-beam process, which is shown in FIG. 2, is applied to almost all cases of track error signal detection.

The three-beam process which has been conventionally applied to the track error signal detection, will now be described with reference to FIGS. 1 to 7.

Referring to FIG. 1, a beam outputted from an optical head 60 is converged on an optical disk 48 and is reflected to return to the optical head 60 with the beam being affected by the data recorded in the optical disk 48. This reflected beam is received by an optical detector 51 as three beam spots 57 to 59 as shown in FIG. 2.

Among these beam spots 57 to 59, the central one (main beam spot) 58 is used to generate a reproduction signal 50S which represents data stored in the optical disk 48, and a defocus signal 51S which controls the beam to be focused on the disk surface.

The other beam spots 57 and 59, which are sub-beam spots, are used to generate a track error signal 52S for accessing tracks.

The defocus signal 51S is generated as follows.

The main beam spot 58 is formed on an optical detector section 51B which has four divisions A to D for outputting currents in proportion to the intensity of the incident beam spot portions. The output currents are converted into predetermined voltages by current-to-voltage converters 52B to 52E in a current-to-voltage converter circuit 52.

The output signals from the divisions A and C of the current-to-voltage converter circuit 52 are added together in an adder 53B of a matrix circuit 53. Likewise, the output signals from the divisions B and D of the circuit 52 are added together in an adder 53A of the matrix circuit 53. The outputs of the adders 53A and 53B are subtracted one from the other by a subtracter 53D, whereby the defocus signal 51S is obtained.

The reproduction signal 50S is obtained through addition of the outputs of the adders 53A and 53B by an adder 53C.

The track error signal 52S is generated from the sub-beam spots 57 and 59 detected by the optical detector sections 51A and 51C which are different from those for the reproduction signal 50S and defocus signal 51S in the following way.

The preceding sub-beam spot 57 is converted by an optical detector section 51A into a current proportional to its intensity and then converted by a current-to-voltage converter section 52A into a corresponding voltage. Likewise, the succeeding sub-beam spot 59 is converted by the optical detector section 51C into a current proportional to its intensity and then converted by a current-to-voltage converter section 52F into a corresponding voltage. The outputs of the current-to-voltage converter sections 52A and 52E are subtracted one from the other in a subtracter 53E, whereby the track error signal 52S is obtained.

The current-to-voltage converter sections 52A to 52F, adders 53A to 53C and subtracters 53D and 53E have structures as shown in FIGS. 3 to 5.

FIG. 3 shows a typical structure of the current-to-voltage converter section 52A among the sections 52A to 52F. Current I outputted from a PD of the optical detector section 51A is converted through an operational amplifier 52Aa and a feedback resistor $R_f$ into an output voltage Vo given as $$Vo = -R_f I$$

FIG. 4 shows a typical structure of the adder 53A among the adders 53A to 53C. Input voltages $V_1$ and $V_2$ are processed through an operational amplifier 53Aa and resistors $R_{s1}$ and $R_{f1}$ to obtain a voltage Vo given as $$Vo = -(V_1 + V_2) \cdot R_{f1}/R_{s1}$$

which is equal to the sum of the two input voltages when $R_{f1} = R_{s1}$.

FIG. 5 shows a typical structure of the subtracter 53D among the subtracters 53D and 53E. The two inputs are processed through an operational amplifier 53Da and resistors $R_{s2}$ and $R_{f2}$ to obtain a voltage Vo given as $$Vo = (V_2 - V_1) \cdot R_{f2}/R_{s2}$$

which is equal to the difference between the two input voltages when $R_{f2} = R_{s2}$.

The method of fast accessing in this prior art optical disk device will now be described.

Referring to FIG. 1, the optical disk 48 is rotated by a spindle motor 49. The optical head 60 has a lens actuator 61, which can move the objective lens vertically and in radial directions of the optical disk 48 for the reading of desired data by the optical head 60, and also a carriage 62, which can travel a long distance in short time.

The reflected beam from the optical disk 48 is detected by the optical detector 51 of the optical head 60 and converted to a current in proportion to beam intensity. The current is converted by the current-to-voltage converter 52 into voltage, which is used in the matrix circuit 53 to obtain the reproduction signal 50S, defocus signal 51S and track error signal 52S.

The reproduction signal 50S is inputted to a demodulator 63, which demodulates data recorded in the optical disk into a signal capable of being discriminated.

The defocus signal 51S is inputted to a phase compensator 65 for phase compensation and then coupled to a drive circuit 68, which controls the lens actuator 61 to cause focusing of the laser beam on the recorded surface of the optical disk 48.

In the normal operation, the track error signal 52S is used as a control signal for track accessing to read data recorded in the optical disk 48. Specifically, the track error signal 52S is inputted to a phase compensator 66 for phase compensation and then coupled to a drive circuit 69 for driving the lens actuator 61 in the radial direction of the optical disk 48.

With the above arrangement, track accessing for reading data can be obtained irrespective of an eccentricity of the optical disk 48 or occurrence of an external disturbance. The track error signal 52S is also coupled to an integrator 67 for integration and then coupled to a drive circuit 70 for driving the carriage 62. The optical head 60 is thus moved by the carriage 62, whereby the lens actuator 61 is always held within limits of movement.

The fast movement operation is as follows. A CPU 71 reads out the present address from the output of the demodulator 63 and calculates the number of tracks up to a desired address. Then, the optical head is moved. In this operation, the track error signal 52S is used as a signal for calculating the position and speed of the optical head, and inputted to a position and speed calculator 64.

The track error signal 52S is provided as one cycle signal whenever a track is crossed. The number of crossed tracks thus can be obtained through the counting of a binary (or pulse) signal obtained from the track error signal 52S, and the speed of movement can be obtained through the counting of the number of tracks crossed per unit time. The CPU 71 reads out data concerning the distance and speed of movement. According to these read-out data, the CPU 71 controls the carriage 62 and the lens actuator 61 for moving the optical head in the radial direction of disk. It is thus possible to cause more accurate and faster movement of the optical head to the desired address.

In the above track error signal detection method in the prior art system, however, the track error signal 52S sometimes may not be able to be detected when fast movement of the optical head in the radial direction of the optical disk 48 has taken place.

The track error signal 52S, as shown in FIG. 6, has a lower band than the reproduction signal 50S, and usually the influence of the reproduction signal may be alleviated by limiting the band of the track error signal. However, as the optical head moves faster, the band of the track error signal 52S shifts from the location shown by reference numeral 52S to the one shown by reference numeral 52S' in FIG. 6. When this takes place, the magnitude of a component of reproduction signal 50S that is introduced in the track error signal can no longer be ignored.

FIG. 7 shows raised or recessed pits P recorded on the optical disk 48 and beam spots 76 to 78 that are formed on the optical disk 48 by the optical head in the case of using the three-beam process. The reproduction signal 50S is obtained from the amounts of light reflected from the main beam spot 77, while the track error signal 52S is obtained from the difference between the amounts of light reflected from a preceding sub-beam spot 76 and a succeeding sub-beam spot 78.

The amounts of reflected light have influence on beam spots and pits located therein, and the track error signal 52S is influenced by the pit array in the case where the pits P that are located in the preceding sub-beam spot 76 and the succeeding sub-beam spot 78 are not of the same pattern.

The reproduction signal component 85 that is introduced into the track error signal 52S has frequencies lower than the intrinsic band of the reproduction signal. This means that the track error signal detection method based on the three-beam process requires a band limitation at lower frequencies than in the case of the single-beam spot track error signal detection method.

The necessity for the fast movement of the optical head has been desired and proposed by many users, and it is one of the most important problems to be solved.

In the above prior art system, the reproduction signal component that is introduced into the track error signal when fast movement of the optical head takes place, cannot be ignored as it deteriorates the performance of detection.

SUMMARY OF THE INVENTION

An object of the invention, therefore, is to provide an optical head seek controller for an optical disk device which can overcome the above drawbacks inherent in the prior art and permits fast and highly accurate movement of the optical head to a desired track position.

According to a first aspect of the invention, there is provided an optical head seek controller having an optical head which produces three beam spots on an optical disk with a data signal recorded thereon in raised and recessed forms and which receives three beam spots reflected from the optical disk; a matrix circuit for processing data contained in the three beam spots received by the optical head to generate and output a predetermined track error signal when accessing a track; and a main controller for controlling the movement of the optical head to a desired track position by calculating a relative position and a speed of the optical head according to the predetermined track error signal from the matrix circuit, the matrix circuit comprising:

a first track error signal generator for generating a first track error signal for track accessing on the optical disk, and a second track error signal generator for generating a second track error signal necessary for the relative position and the speed of the optical head with respect to the optical disk, the second track error signal generator having a function of generating the second track error signal by a push-pull process according to data concerning the main beam spot as the central one of the three beam spots.

This first aspect of the invention is featured in that the track error signal, which is generated when causing fast movement of the optical head in the radial direction of the optical disk and used to calculate the relative positions and speeds of the optical disk and optical head, is detected by means different from means concerning the track error signal for accessing tracks. Another feature resides in the methods of detecting two or more different track error signals, and in the use of the three-beam process for the detection of the track error signal for accessing tracks and the single-beam process (preferably a push-pull process) for the detection of the track error signal for the relative position and speed calculations.

In the arrangement according to the first aspect of the invention, as shown in FIGS. 8 and 9, a track error signal 25 for the relative position and speed calculations and a track error signal 27 for track accessing, are detected by methods suited to them. This will now be described with reference to FIGS. 8 and 9. A beam from an optical head 33 is focused on the recorded surface of an optical disk 31, and is reflected and returned to the optical head 33 with the reflected beam being affected by the data on the optical disk 31. Specifically, three beam spots 7 to 9 are formed on an optical detector 1. The beam spot 8 is used to generate a reproduction signal 24 as data recorded in the optical disk 31, a defocus signal 26 for beam focusing on the disk surface, and a track error signal 25 for relative position and speed calculations. The preceding and succeeding beam spots 7 and 9 are used to generate a track error signal 27 for track accessing.

Denoting the output signals of current-to-voltage converter sections 10 to 15 of a current-to-voltage converter 2 by Ve, Vd, Va, Vb, Vc and Vf, respectively, the reproduction signal 24 is given as Va+Vb+Vc+Vd, and the defocus signal 26 is given as (Vb+Vd)−(Va+Vc). The track error signal 25 for the relative position and speed calculations is given as (Vd+Vc)−(Va+Vb), and the track error signal 27 for track accessing is given as Ve−Vf. In the present system, the three-beam process is used for the method of detecting the track error signal for track accessing, and the push-pull process is used for detecting the track error signal for relative position and speed calculations.

The track error signal, as shown in FIG. 12, can be brought closer to the band 24 of the reproduction signal by fast movement the optical head. In the three-beam process, a reproduction signal component 81 that is introduced into the track error signal, has a broader band than the actual reproduction signal 24. When the push-pull process is used for the track error signal detection, however, the track error signal is detected from a single-beam spot, so that the band of the reproduction signal component introduced into the track error signal is equal to the intrinsic band of the reproduction signal 24.

As shown in FIG. 12, when using the push-pull process, the introduced reproduction signal component as shown by reference numeral 82, is narrow in band compared to the component 81 when the three-beam process is used. Thus, the reproduction signal component can be suppressed using a band pass filter or the like to reduce unnecessary components of the track error signal.

According to a second aspect of the invention, there is provided an optical head seek controller wherein the second track error signal generator includes signal adjusting means for minimizing data signal present in the second track error signal.

This second aspect of the invention is featured in that, when the push-pull process is used as means for detecting the track error signal for the relative position and speed calculations, the data signal component present in the track error signal, which is generated from the optical detector having two or more divisions for converting optical signal from the optical disk into electric signal, is minimized by the time the track error signal is generated.

This second aspect of invention seeks to reduce the reproduction signal component introduced in the track error signal. Inaccurate positioning and sensitivity fluctuations of elements of the optical detector 1, may result in an increase in the reproduction signal component introduced into the track error signal when light reflected from the optical disk 31 is received by the optical detector 1. A structure as shown in FIG. 10 is used to reduce influence of the inaccurate positioning or sensitivity fluctuations of the optical detector elements. Thus structure permits suppression of the reproduction signal component 82 shown in FIG. 12 to one shown by reference numeral 83.

Further details of the above will now be described with reference to FIG. 10. The structure shown in FIG. 10 deals with the track error signal for relative position and speed calculations. Denoting current outputs of optical detector sections A to D by Ia to Id, current-to-voltage converter sections 11 to 14 provide outputs −Z·Id, −Z·Ia, −Z·Ib and −Z·Ic, respectively. Denoting these outputs by −Vd, −Va, −Vb and −Vc, respectively, the track error signal Vo is $$Vo = a \cdot (Vc+Vd) - (Va+Vb)$$

This signal Vo can be optimized by controlling the resistance of a variable resistor 68 in an adder 17 (see FIG. 10), thereby minimizing the reproduction signal component introduced into the track error signal. The variable resistor 88 in the adder 17 functions as the signal adjusting means mentioned above.

Since a deviation of the objective lens position from the center causes a push-pull signal off-set, capacitors 84 to 87 are provided as shown in FIG. 10 for removing low frequency components that are irrelevant to the track error signal. This permits suppression of unnecessary reproduction signal component introduced in the track error signal for relative position and speed calculations.

According to a third aspect of the invention, there is provided an optical head seek controller having an optical head for producing three beam spots on an optical disk with data signal recorded thereon in raised and recessed forms and receiving three beam spots reflected from the optical disk, a matrix circuit for processing data contained in the three beam spots received by the optical head to generate and output a predetermined track error signal when accessing a track, and a main controller for controlling the movement of the optical head to a desired track position by calculating a relative position and a speed of the optical head according to the predetermined track error signal from the matrix circuit, the optical head seek controller comprising;

a track error signal generator, in the matrix circuit, for generating the track error signal for accessing tracks on the optical disk and for position and speed detection necessary for calculating the relative position and the speed of the optical head with respect to the optical disk, and a signal delaying means, in the track error signal generator, for delaying the signal concerning a preceding one of the three beam spots by a delay time corresponding to an inter-beam distance between the preceding one and a succeeding one of the three beam spots according to a linear speed data about the optical disk, the track error signal being generated according to the difference between signals concerning the preceding and succeeding beam spots after removal of the time difference between the preceding and succeeding beam spot signals.

This third aspect of the invention is featured in that, where the three-beam process is used as means for detecting the track error signal for the relative position and speed calculations, the signal delaying means is provided which delay the preceding beam signal for a period of time calculated from the inter-beam distance and the linear speed of the optical disk for correcting the time difference between preceding and succeeding beam signals, which are obtained through conversion of the preceding and the succeeding beam into electric signals by the optical detector having two or more divisions for converting a plurality of beams reflected from the optical disk into electric signals, and that the track error signal is generated according to the difference between the preceding and succeeding beam signals after removal of the time difference between the preceding and succeeding beam differences.

The third aspect of the invention seeks to obtain the track error signal for relative position and speed calculations by using the three-beam process. Specifically, it is sought to reduce the band of the undesired signal component as shown by reference numeral 81 in FIG. 12 to one as shown by reference numeral 82. In the three-beam process, a band spread is caused by the formation of beam spots on pits at different positions as shown in FIG. 7. This problem can be solved by making up for the time difference between the preceding and succeeding beam spots 76 and 78. Denoting the distance between the preceding and succeeding beam spots 76 and 78 by 1 and the linear speed of the disk rotation by v, the inter-beam time difference $\tau$ is given as $\tau=1/v$. The band of the undesired signal component in the track error signal can be reduced by delaying the preceding beam signal by the time with signal delaying means. By so doing, the influence on the track error signal can be reduced.

According to a fourth aspect of the invention, there is provided an optical head seek controller wherein the track error signal generator includes a signal input stage having adjusting means for minimizing a reproduction signal component present in the track error signal from the track error signal generator.

This fourth aspect of the invention is featured in that, when the three-beam process in which the preceding beam signal is delayed is used for detecting the track error signal for the relative position and speed calculations, the data signal component present in the track error signal which is generated from the optical detector having two or more divisions for the converting optical signal from the optical disk into an electric signal, is minimized by the time the track error signal is generated.

The fourth aspect of the invention seeks to reduce adverse effects of the inaccurate positioning and sensitivity fluctuations of optical detector elements while making up for the time difference between the preceding and succeeding beams, which is a cause of the band spread, in order to obtain the track error signal for relative position and speed calculations with the three-beam process. This will be described with reference to FIG. 11. The output currents from optical detector sections 1A and 1C for track error detection, are converted by current-to-voltage converter sections 10 and 15 into voltages. The current-to-voltage converter sections 10 and 15 have an equivalent structure to that of the circuit 11 shown in FIG. 10, and they permit suppression of the undesired reproduction signal component introduced into the track error signal by causing the resistance of feedback resistor $R_f$ to be varied.

According to a fifth aspect of the invention, there is provided an optical head seek controller wherein the signal delaying means has a function of varying the signal delaying time according to variations of the linear speed of the optical disk.

This fifth aspect of the invention is featured in that when the three-beam process in which the preceding beam signal is delayed is used for detecting the track error signal for the relative position and speed calculations, the signal delaying time of the signal delaying means can be varied according to variations of the linear speed of the optical disk.

The fifth aspect of the invention seeks to be able to cope with the time difference between the preceding and succeeding beams as the cause of the band spread when the linear speed of the disk rotation is varied as well, in order to obtain the track error signal for relative position and speed calculations with the three-beam process. Again by denoting the distance between the preceding and succeeding beam spots by 1 and the linear speed by v, the time difference $\tau$ is given as $\tau=1/v$. A delay element 28 shown in FIG. 11 can provide a variable delay time according to the linear speed v, thus permitting band reduction of the undesired reproduction signal component introduced in the track error signal at all times.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are described with reference to the accompanying drawings.

Figure 1:
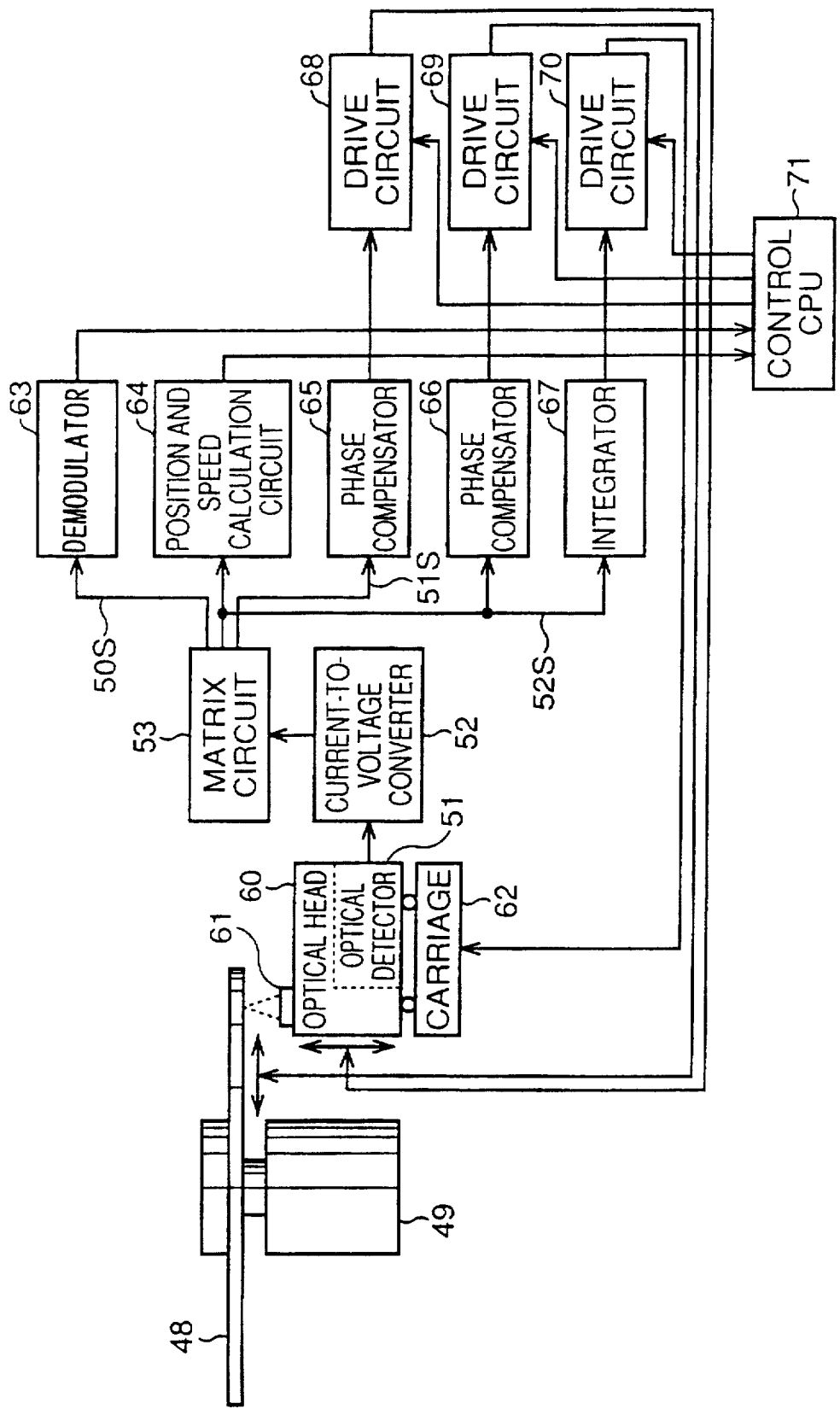
FIG. 1 is a block diagram showing a prior art optical head seek controller.
Figure 2:
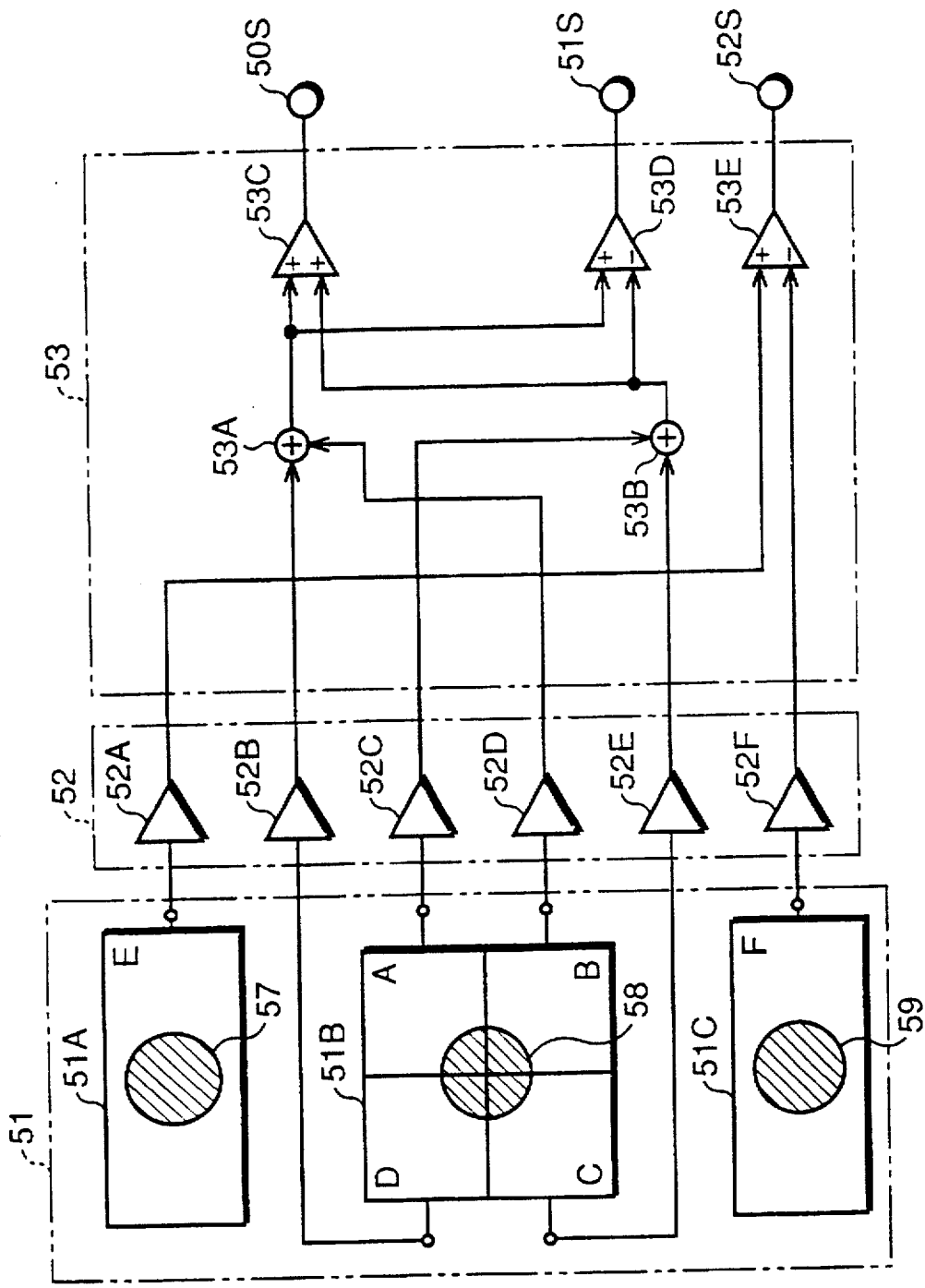
FIG. 2 is a circuit diagram showing a track error signal generation part of the system shown in FIG. 1.
Figure 3:
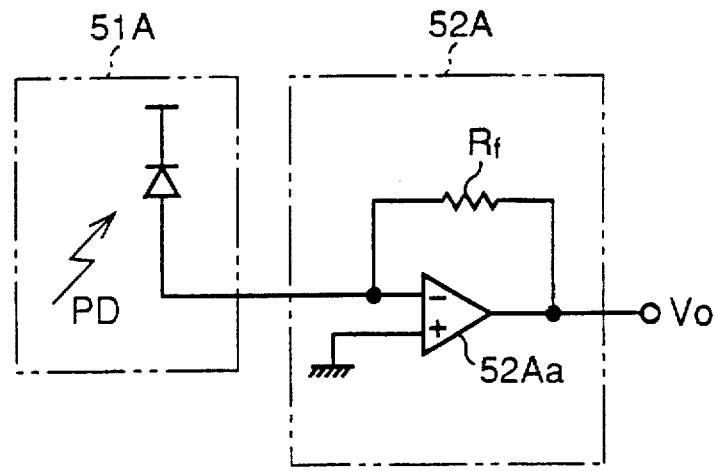
FIG. 3 is a circuit diagram showing an example of current-to-voltage generator shown in FIG. 1.
Figure 4:
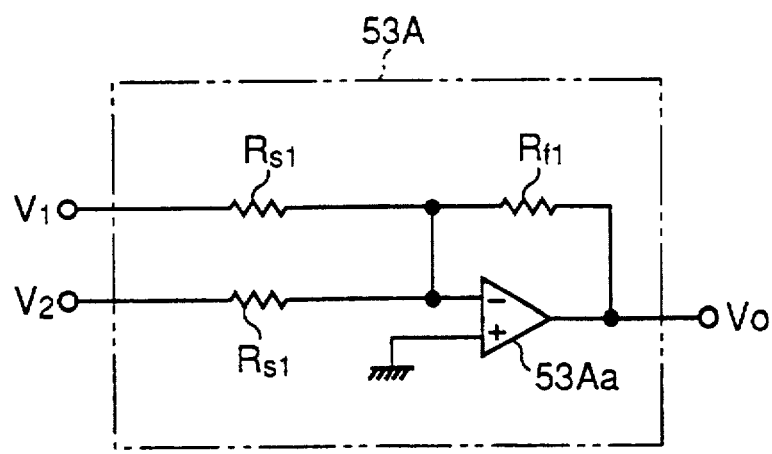
FIG. 4 is a circuit diagram showing an example of adder shown in FIG. 1.
Figure 5:
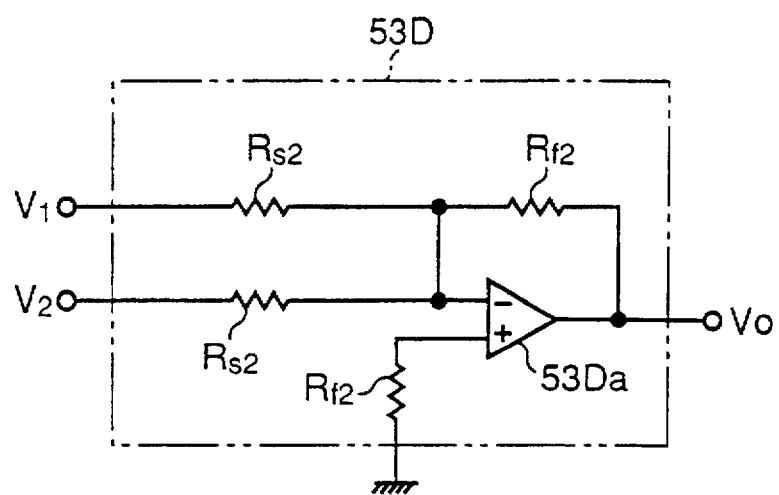
FIG. 5 is a circuit diagram showing an example of subtracter shown in FIG. 1.
Figure 6:
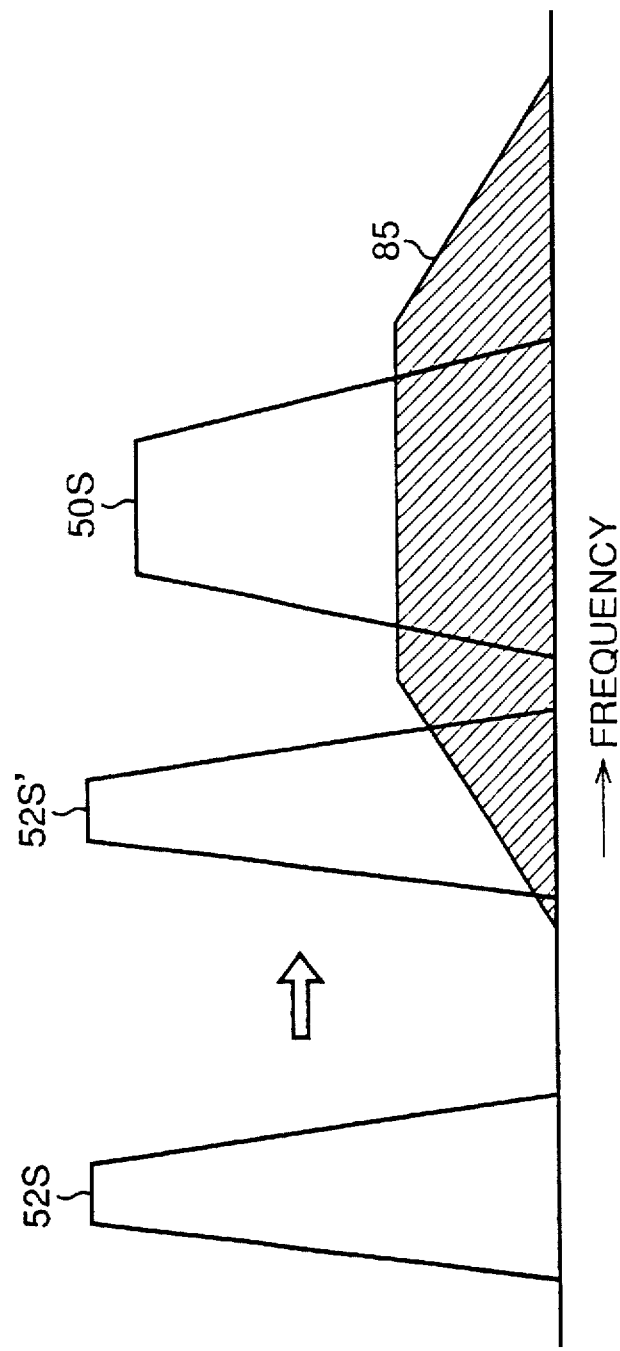
FIG. 6 is a diagram referred to in the description of operation of the prior art optical head seek controller.
Figure 7:
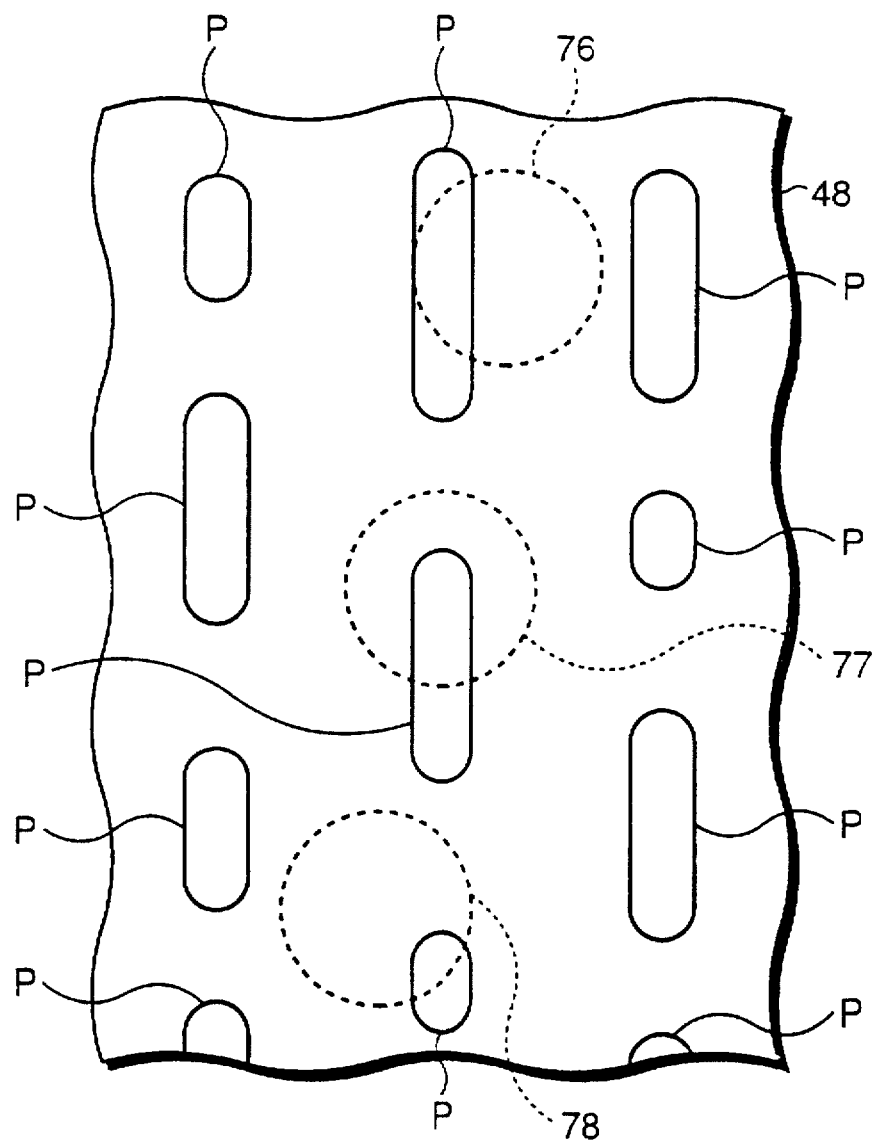
FIG. 7 is a diagram referred to in the description of the relation of pits on an optical disk and beam spots formed thereon by an optical head.
Figure 8:
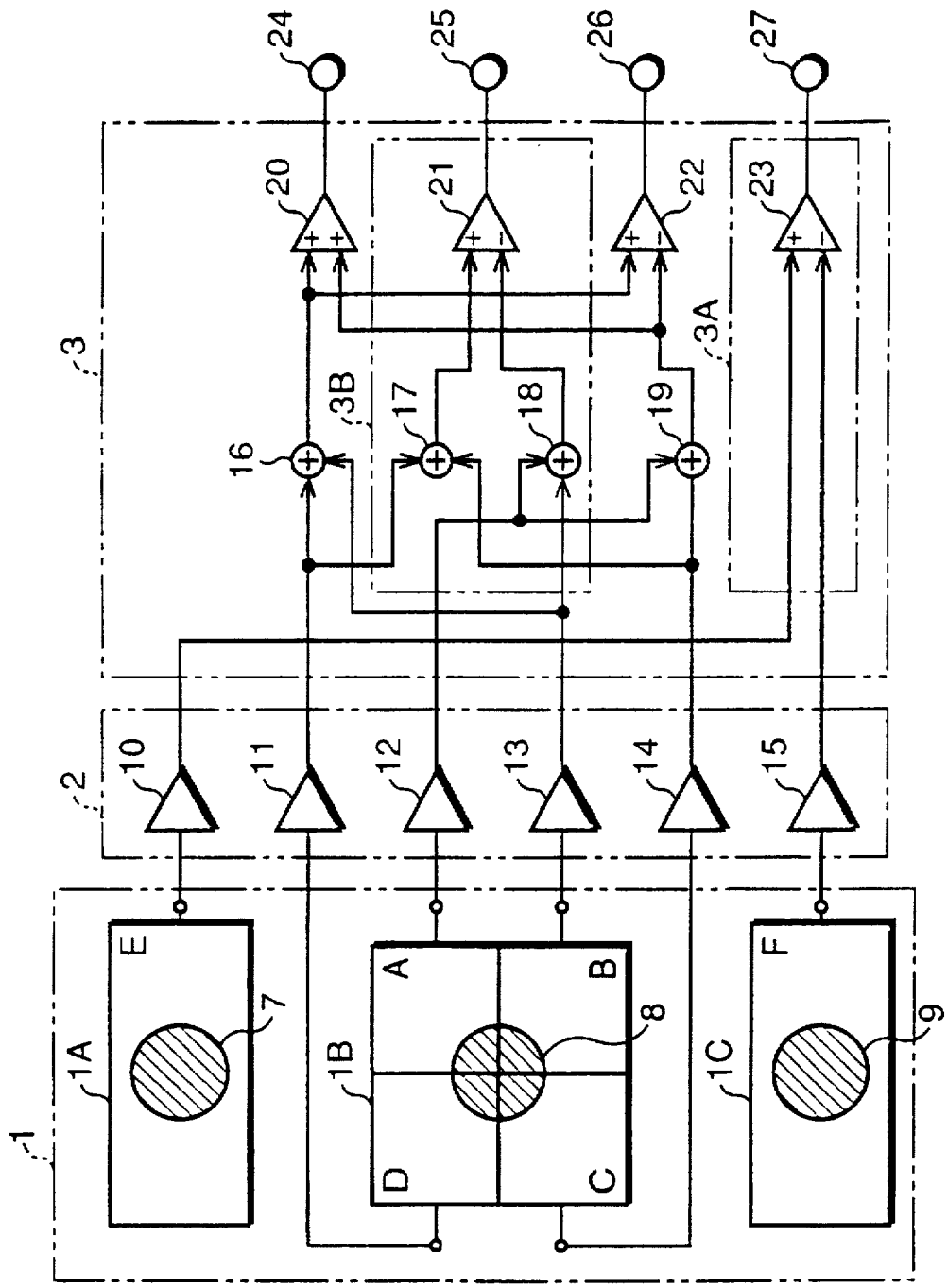
FIG. 8 is a circuit diagram showing a track error signal generation part of an embodiment of the optical head seek controller according to the invention.
Figure 9:
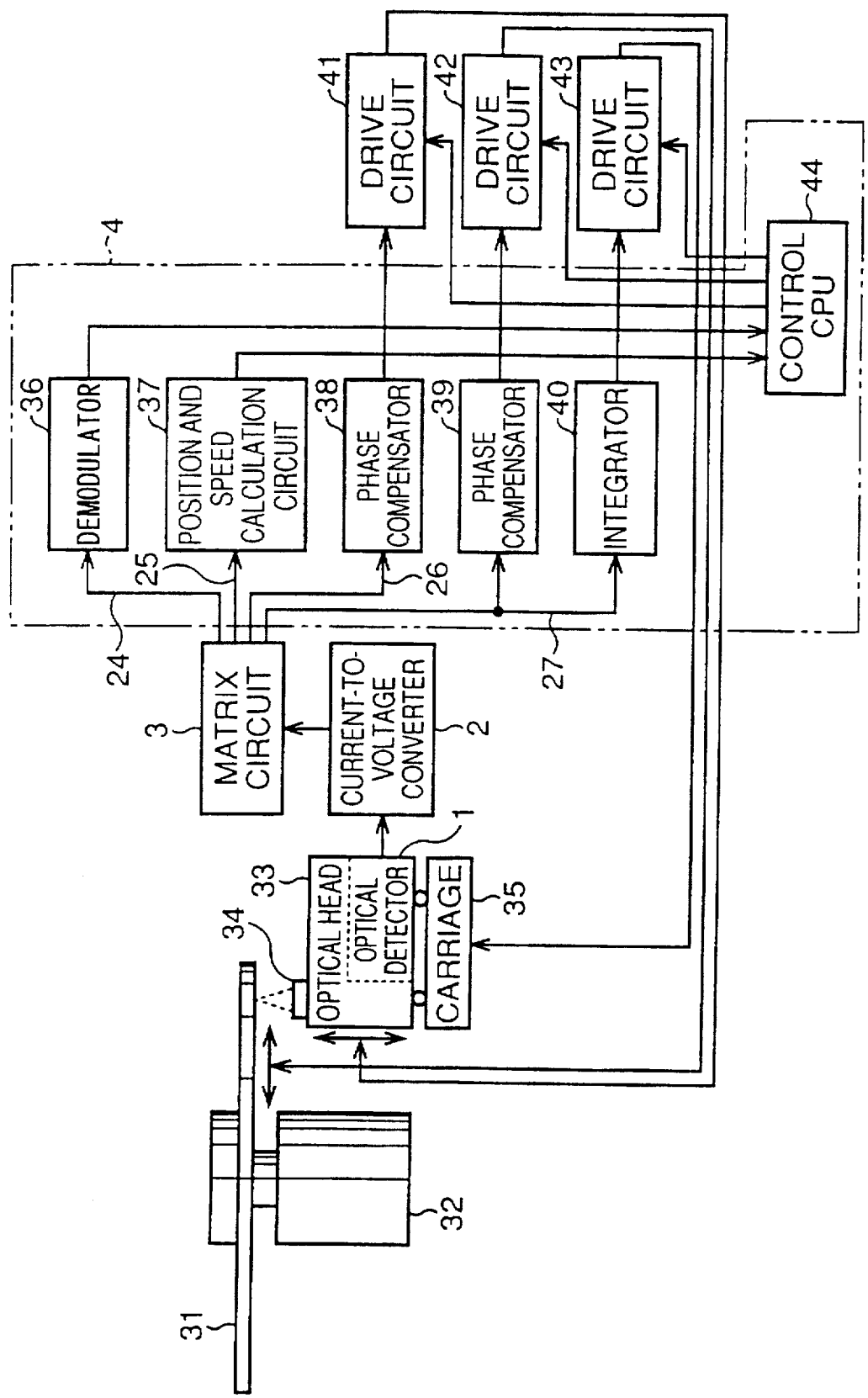
FIG. 9 is a block diagram showing an embodiment of the optical head seek controller according to the invention.

An embodiment is illustrated in FIGS. 8 and 9, in which reference numeral 1 designates an optical detector, reference numeral 31 designates an optical disk with data signal recorded thereon in raised and recessed forms, and reference numeral 33 designates an optical head. The optical head 33 has functions of forming three beam spots on the optical disk 31 and receiving three beams reflected by the optical disk 31.

The embodiment shown in FIGS. 8 and 9 further comprises a matrix circuit 3, which processes data signals concerning three beam spots formed on the optical head 33 to generate and output a predetermined track error signal for track accessing, and a main controller 4, which controls the movement of the optical head 33 to a desired track position through calculation of the position and speed of the optical head 33 according to the predetermined track error signal outputted from the matrix circuit 3.

The matrix circuit 3 includes a first track error signal generator 3A, which generates a track error signal 27 for accessing tracks on the optical disk 31, and a second track error signal generator 3B, which generates a track error signal 25 necessary for calculation of the relative position and speed of the optical head 33 with respect to the optical disk.

The second track error signal generator 3B generates the track error signal 25 by the push-pull process according to data concerning the central one of the three beam spots 1A to 1C, i.e., the main beam spot 1B. The second track error signal generator 3B includes signal adjusting means to be described later, which serves to minimize data signal component in the second track error signal 25.

Light reflected from the optical disk 31 forms three beam spots 7 to 9 on the optical detector 1. The beam spot 8 is used to generate a reproduction signal 24 which is recorded as data on the optical disk 31, a defocus signal 26 for controlling the beam focusing on the disk surface, and a track error signal 25 for relative position and speed calculations. The beam spots 7 and 9 are used to generate a track error signal 27 for track accessing.

In this embodiment, the defocus signal 26 is formed according to data concerning the three beam spots 7 to 8 formed on the optical detector 1 as follows.

The main spot light 8 is incident on an optical detector section 1B having four divisions A to D and, from the respective optical detector section divisions A to D, the currents proportional to the intensity of respective portions of the incident main spot light 8 are outputted. The output currents are individually converted by current-to-voltage converter sections 11 to 14 of the current-to-voltage converter 2 into respective voltages. In the matrix circuit 3, voltage signals obtained from the outputs of the optical detector section divisions A and C are added together in an adder 19. Signals obtained from the outputs of the other optical detector section divisions B and D are added together in an adder 16. The outputs of the adders 16 and 19 are subtracted from one another, whereby the defocus signal 26 is generated. The reproduction signal 24 is obtained from an adder 20, which adds together the output signals of the adders 16 and 19.

The track error signal 25 for relative position and speed calculations is generated from the main beam spot 8 formed on the optical detector section 1B in the following process. The current-to-voltage converter sections 11 to 14 provide voltages from signals concerning the four divisions of the main beam spot 8 formed on the optical detector section 1B for detecting the defocus signal and reproduction signal. Of these voltages, those from the current-to-voltage converter sections 12 and 13 are added together in an adder 18 in the matrix circuit 3. Also, the voltage outputs of the current-to-voltage converter sections 11 and 14 are added together in an adder 17. The outputs of the adders 17 and 18 are subtracted one from the other by a subtracter 21, whereby the track error signal 25 for relative position and speed calculations is generated.

The adders 17 and 18 and subtracter 21 constitute the second track error signal generator 3B described above.

Figure 10:
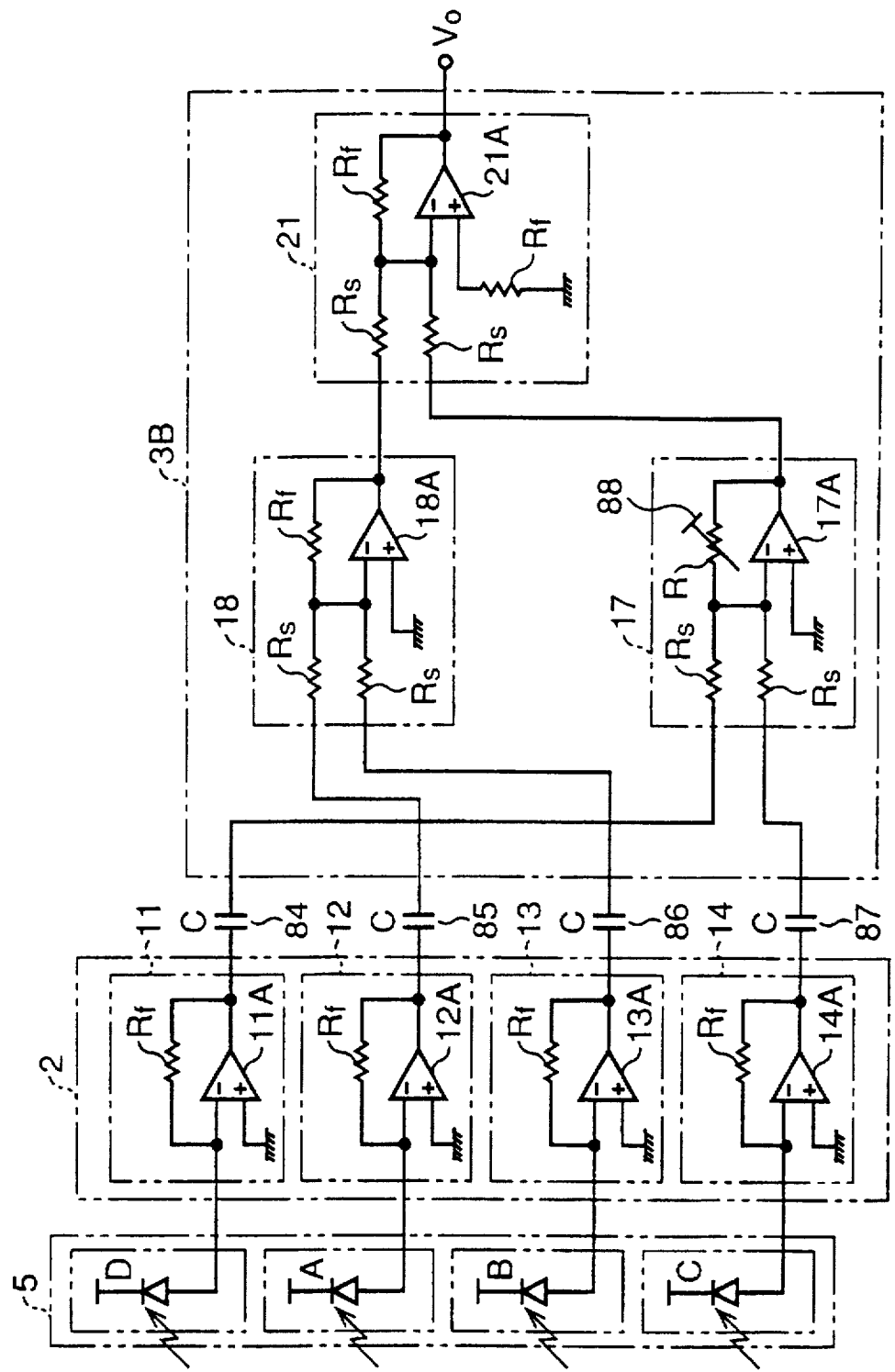
FIG. 10 is a circuit diagram showing a specific example of a second track error signal generator shown in FIG. 8.

A specific example of the second track error signal generator 3B is shown in FIG. 10. What is shown in FIG. 10 is a part of the circuit shown in FIG. 8 that has bearing on the track error signal 25 for relative position and speed calculations. Denoting the currents outputted from the optical detector section divisions A, B, C and D by Ia Ib, Ic and Id, the outputs of the current-to-voltage converter sections 11 to 14 are $-Z \cdot Id$, $-Z \cdot Ia$, $-Z \cdot Ib$ and $-Z \cdot Ic$, respectively. Denoting these outputs by $-Vd$, $-Va$, $-Vb$ and $-Vc$, the track error signal Vo is $$Vo=a \cdot (Vc+Vd)-(Va+Vb)$$

The resistance of a variable resistor 88 in the adder 17 (see FIG. 10) is adjusted to provide an optimum value as the signal, thus minimizing the reproduction signal component in the track error signal.

Since a deviation of the objective lens position from the center causes generation of a push-pull signal off-set, capacitors 84 to 87 with adequate capacitance C are provided for removal of low frequency components irrelevant to the track error signal. In the above way, the unnecessary reproduction signal component that is introduced into the track error signal for relative position and speed calculations can be suppressed.

The track error signal 27 for track accessing is generated with the optical detector sections 1A and 1C and sub-beam spots 7 and 9, different from those for the reproduction signal 24 and defocus signal 26, in the following process shown in FIG. 8. The optical detector section 1A converts the preceding sub-beam spot 7 into a current proportional to the light intensity of the sub-spot, which is in turn converted by a current-to-voltage converter section 10 into a voltage. Likewise, the optical detector section 1C converts the succeeding sub-beam spot 9 into a current proportional to the light intensity, which is in turn converted by a current-to-voltage converter section 15 into a voltage. A subtracter 23 subtracts the outputs of the current-to-voltage converter sections 10 and 15 from each other, whereby the track error signal 27 is generated. The subtracter 23 which subtracts the outputs of the current-to-voltage converter sections 10 and 15, constitutes the first track error signal generator 3A described above.

In this embodiment, the other current-to-voltage converter sections 10 and 15, adders 16, 19 and 20 and subtracters 22 and 23 in the current-to-voltage converter 2 used in the circuit shown in FIG. 8, are the same in structure as the current-to-voltage converter sections 11 to 14, adders 17 and 18 and subtracter 21 in the circuit shown in FIG. 10, respectively.

More specifically, the current-to-voltage converters 10 and 14 have the same structure as the current-to-voltage converter 11 shown in FIG. 10. In this circuit structure, current I outputted from the optical detector is converted by an operational amplifier 11A and a feedback resistor $R_f$ into output voltage Vo given as $$Vo=-R_f I$$

The adders 16, 19 and 20 have the same structure as the adder 17 shown in FIG. 10. In this structure, output voltage Vo given as $$Vo=-(V_1+V_2) \cdot R/R_s$$

is produced from input voltages $V_1$ and $V_2$ by an operational amplifier 17A and resistors $R_s$ and R. When $R=R_s$, the output voltage is equal to the sum of the two input voltages.

The subtracters 22 and 23 have the same structure as the subtracter 21 shown in FIG. 10. In this structure, output voltage Vo given as $$Vo = (V_2 - V_1) \cdot R_f / R_s$$

is produced from input voltages $V_1$ and $V_2$ by an operational amplifier 21A and resistors $R_s$ and $R_f$. When $R_f = R_s$, the output voltage is equal to the difference between the two input voltages.

The method of fast accessing in this optical disk device, will now be described with reference to FIG. 9. The optical disk 31 is rotated by a spindle motor 32. For reading desired data, the optical head 33 includes a lens actuator 34, which can move the objective lens up and down and also in the radial direction of the optical disk 31, and a carriage 35 for traveling a long distance in short time.

The optical detector I of the optical head 33 detects light reflected from the optical disk 31 for conversion to a current proportional to the light intensity. The current is converted by the current-to-voltage converter 2 into voltage to be used in the matrix circuit 3 to generate the reproduction signal 24, the track error signal 25 for relative position and speed calculations, the defocus signal 26, and the track error signal 27 for track accessing. The reproduction signal 24 is inputted to a demodulator 36, which demodulates data recorded on the optical disk into a signal capable of being discriminated.

The defocus signal 26 is phase compensated in a phase compensator 38 and then coupled to a drive circuit 42 for controlling the lens actuator 34 to obtain beam focusing on the recording surface of the optical disk.

The track error signal 27 for track accessing is used as a control signal for accessing a track to read out data recorded on the optical disk. It is phase compensated in a phase compensator 39 and then coupled to a drive circuit 42 for moving the lens actuator 34 in the radial direction of the optical disk.

The track from which data is being read out, thus can be held accessed irrespective of eccentricity of the optical disk or occurrence of external disturbances. The track error signal 27 is integrated in an integrator 40 and then coupled to a drive circuit 43 for driving the carriage 35 in unison with the optical head 33. It is thus possible to have the lens actuator 34 within the limits of movement at all times.

The fast movement operation will now be described. A control CPU 44 in the main controller 4 reads out the present address through the demodulator 36 and calculates the number of tracks up to a desired address. Then, an operation of moving the optical head is started. In this case, whenever a track is crossed, an accurate one cycle signal can be obtained as the track error signal 25 for relative position and speed calculations. The number of tracks which the optical head is moved across, is thus obtained through the counting of binary signal (i.e., pulse signal) obtained from the track error signal, and the movement speed is obtained through the counting of the number of tracks crossed per unit time by the position and speed calculation circuit 37.

By reading the distance and speed of the movement thus obtained, the CPU 44 controls the carriage 35 and the lens actuator 34 for movement in the radial direction of the optical disk. It is possible to obtain accurate and fast movement of the optical head to a desired track position.

Figure 11:
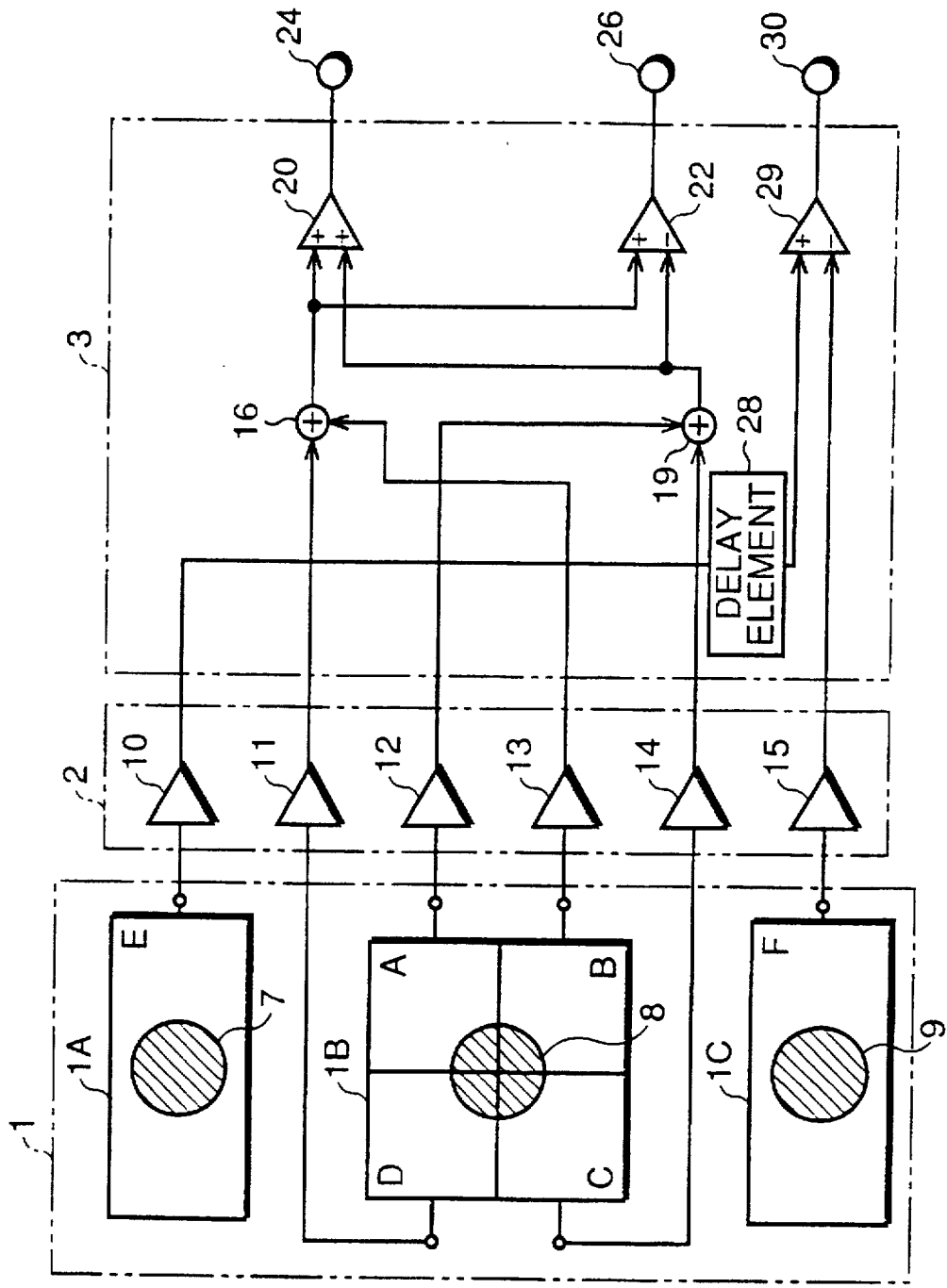
FIG. 11 is a circuit diagram showing a track error signal generation part in a different embodiment of the invention.
Figure 12:
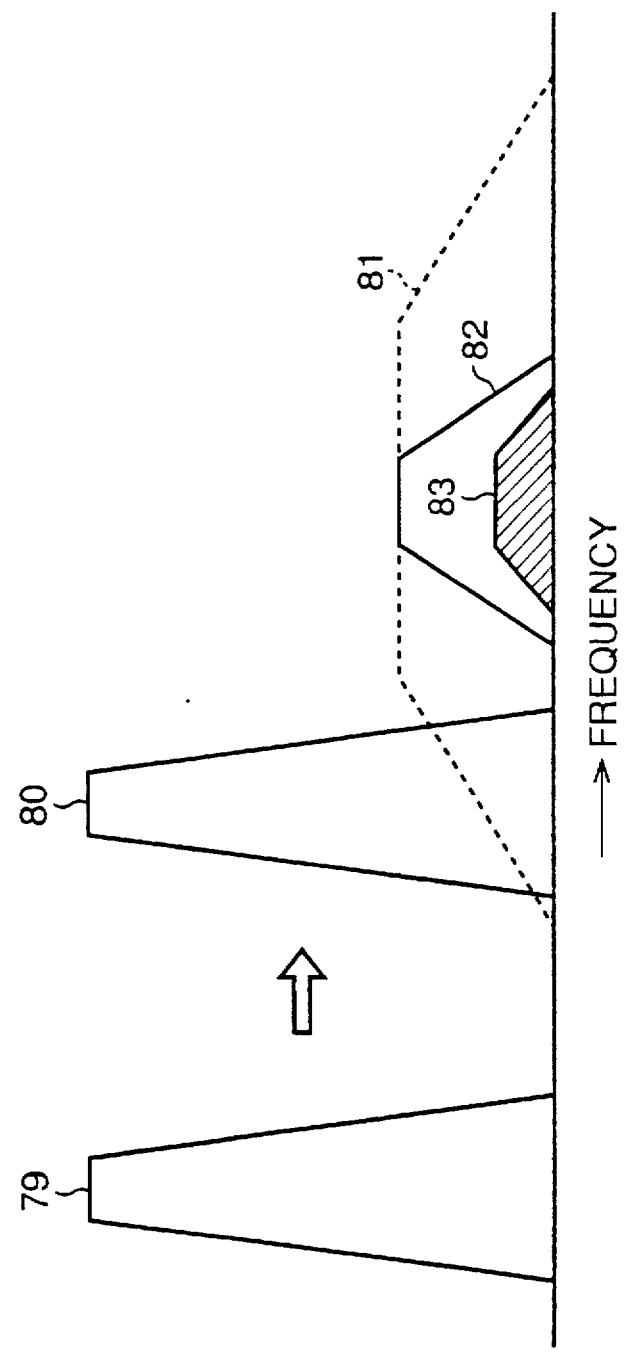
FIG. 12 is a view referred to in the description of operation of the embodiment shown in FIGS. 8 and 9.

FIG. 11 shows a different circuit for obtaining the track error signal 25 for relative position and speed calculations with the three-beam process.

Referring to FIG. 11, three reflected beam spots 7 to 9 (see FIG. 8) are formed on the optical detector 1. The main beam spot 8 at the center is used to generate the reproduction signal 24 as data recorded on the optical disk 31 and also the defocus signal 26 for beam focusing on the disk surface. The preceding and succeeding beam spots 7 and 9 are used to generate the track error signal 30 for track accessing and also for relative position and speed calculations.

In this embodiment shown in FIG. 11, the track error signal 30 for track accessing and for relative position and speed calculations is generated with optical detector sections 1A and 1C and sub-beam spots 7 and 9, different from those for the reproduction signal 24 and defocus signal 26, in the following process.

The optical detector section 1A converts the preceding sub-beam spot 7 into a current proportional to light intensity, which is then converted by a current-to-voltage converter section 10 into voltage. Likewise, an optical detector section 1C converts the succeeding sub-beam spot 9 into a current proportional to light intensity, which is then converted by a current-to-voltage converter section 15 to voltage. The output of the current-to-voltage converter section 10, which is the preceding beam signal, is delayed in a delay element 28 for time τ.

The delay time τ is set to τ=1/v, where 1 is the distance between the preceding and succeeding beam spots on the optical disk and v is the linear speed for reading the disk data. A subtracter 29 subtracts the delayed signal, which is delayed from the output of the current-to-voltage converter section 10 by the delay element 28, and the output of the voltage converter section 10, and the output of the current-to-voltage converter 15 one from the other, whereby the track error signal 30 for track accessing and for relative position and speed calculations is generated.

As has been described in the foregoing, according to the invention, continuous and highly accurate detection of track error signal can always be obtained in the operation of fast movement of the optical head, and thus it is possible, even in a coarse seek operation, to obtain accurate and fast optical head controller to a desired track. Thus, an unique and excellent optical head seek controller can be provided, which permits great reduction of the access time with respect to the optical head.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An optical head seek controller having an optical head for producing three beam spots on an optical disk with data signal recorded thereon in raised and recessed forms and receiving three beam spots reflected from said optical disk, a matrix circuit for processing data contained in said three beam spots received by said optical head to generate and output a predetermined track error signal when accessing a track, and a main controller for controlling the movement of said optical head to a desired track position by calculating a relative position and a speed of said optical head according to said predetermined track error signal from said matrix circuit, said optical head seek controller comprising;

a track error signal generator, in said matrix circuit, for generating the track error signal for accessing tracks on said optical disk and for position and speed detection necessary for calculating said relative position and said speed of said optical head with respect to said optical disk, and a signal delaying means, in said track error signal generator, for delaying the signal concerning a preceding one of said three beam spots by a delay time corresponding to an inter-beam distance between said preceding one and a succeeding one of said three beam spots according to a linear speed data about said optical disk, said track error signal being generated according to the difference between signals concerning said preceding and succeeding beam spots after removal of the time difference between the preceding and succeeding beam spot signals.

2. The optical head seek controller according to claim 1, wherein said track error signal generator includes a signal input stage having adjusting means for minimizing a reproduction signal component present in said track error signal from said track error signal generator.

3. The optical head seek controller according to claim 1, wherein said signal delaying means has a function of varying the signal delaying time according to variations of said linear speed of said optical disk.

* * * * *

UNITED STATES PATENT AND TRADEMARK OFFICE
CERTIFICATE OF CORRECTION

PATENT NO. : 5,787,059
DATED : July 28, 1998
INVENTOR(S) : SOHMUTA

It is certified that error appears in the above-identified patent and that said Letters Patent is hereby corrected as shown below:

Cover page, Item [30], "03/31/95" should be --03/23/95--

Signed and Sealed this

Ninth Day of November, 1999

Attest:

Q. TODD DICKINSON

Attesting Officer

Acting Commissioner of Patents and Trademarks